July 17, 1923.
T. DE L. GRAHAM
1,462,036
AUTOMOBILE HEADLIGHT AND REFLECTOR
Filed Aug. 25, 1922
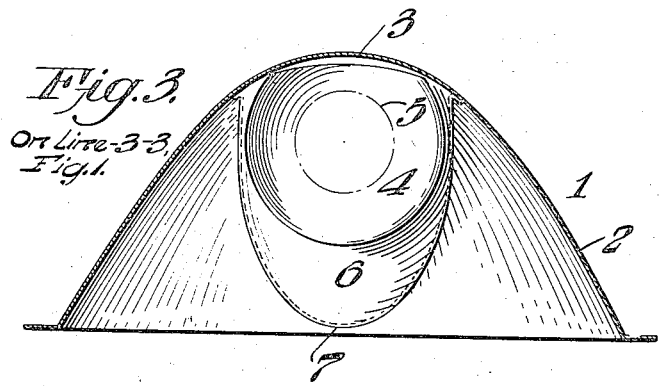
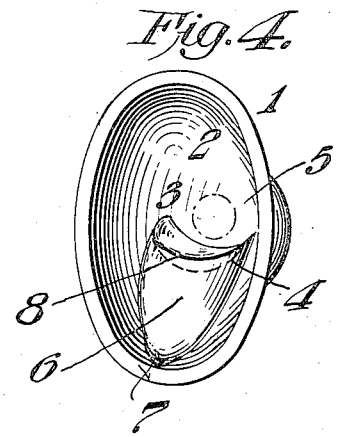
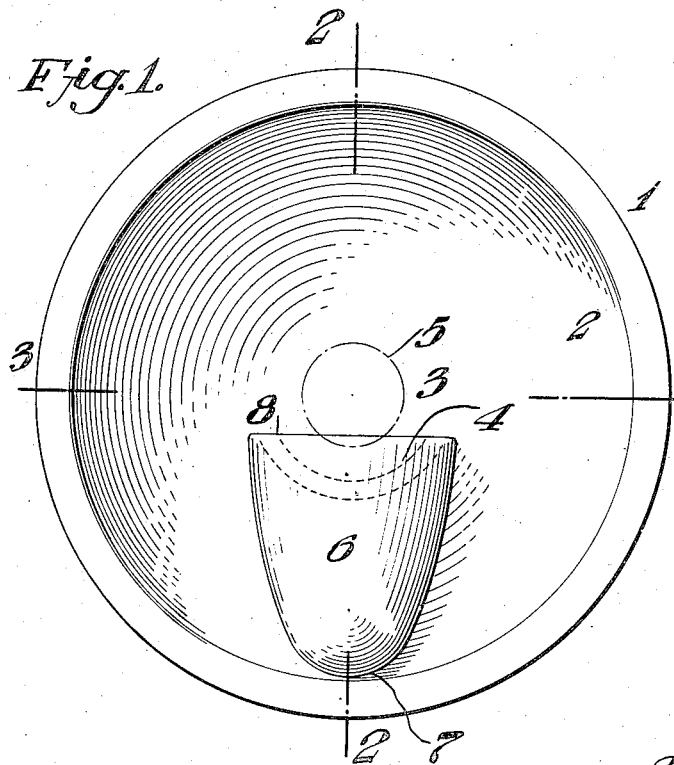
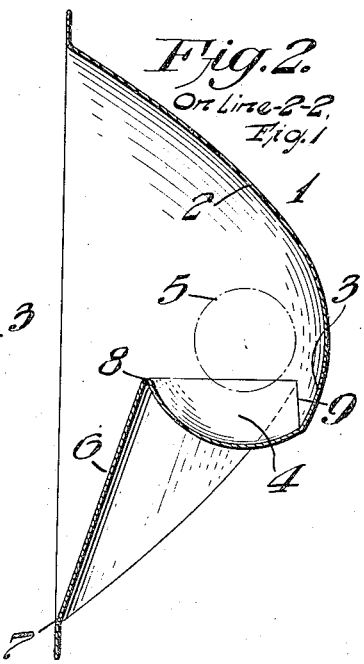
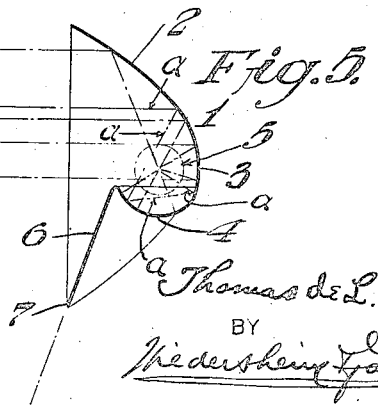
INVENTOR:
Thomas de L. Graham
BY
ATTORNEYS.

Patented July 17, 1923.

1,462,036

UNITED STATES PATENT OFFICE.

THOMAS DE LEON GRAHAM, OF PHILADELPHIA, PENNSYLVANIA, ASSIGNOR OF ONE-THIRD TO F. MORTIMER CLEVELAND, OF PHILADELPHIA, PENNSYLVANIA.

AUTOMOBILE HEADLIGHT AND REFLECTOR.

Application filed August 25, 1922. Serial No. 584,199.

*To all whom it may concern:*

Be it known that I, THOMAS DE LEON GRAHAM, a citizen of the United States, residing in the city and county of Philadelphia, State of Pennsylvania, have invented a new and useful Automobile Headlight and Reflector, of which the following is a specification.

My invention consists of a novel construction of headlight reflector, particularly adapted for automobiles and other self propelled vehicles, wherein I locate within a primary or parabolic reflector a secondary or concave reflector directly under and in proximity to the source of light, below which I locate a convex reflector, whose horizontal median line extends at substantially a right angle to the horizontal axis of the source of light and whose outer convex surface inclines from a point within the primary or parabolic reflector downwardly and outwardly to a point coincident with the lower outer portion of said parabolic reflector whereby the lower central portion of the main parabolic reflector is rendered incapable of diffusing light rays in planes above the top of the device so as to blind the driver of an approaching vehicle.

By my invention a novel device is produced, whereby the driver of a motor vehicle, is enabled distinctly to see the road ahead for its full width, and for an extent of several hundred feet ahead, and the light rays are deflected both downwardly upon the road in advance of the vehicle, and directly ahead in substantially horizontal or other planes which shall not rise high enough above the ground to dazzle the eyes of approaching pedestrians or drivers of approaching vehicles, the construction and mode of operation being such that my novel device not only constitutes a compliance with the laws of the various States, but provides a headlight, which will project the rays of light emanating from a source within it, in substantially parallel planes from the reflecting surfaces, below the top of the headlight, so that all the light beams or rays are properly utilized, and substantially no light strikes said reflecting surfaces at such angles as to be reflected improperly upwardly.

It further consists of other novel features of advantage and construction as will be hereinafter set forth.

For the purpose of illustrating my invention, I have shown in the accompanying drawings, a form thereof which is at present preferred by me, since the same will give in practice satisfactory and reliable results, although it is to be understood that the various instrumentalities of which my invention consists may be variously arranged and organized and that my invention is not limited to the precise arrangement and organization of these instrumentalities as herein shown and described.

Figure 1 represents a front elevation of a novel construction of reflector, embodying my invention.

Figure 2 represents a vertical section of Figure 1, taken on line 2—2 Figure 1.

Figure 3 represents a horizontal section of the reflector, the section being taken on the line 3—3 of Figure 1.

Figure 4 represents on a reduced scale a perspective view of Figure 1.

Figure 5 represents on a reduced scale, a vertical sectional view corresponding to the section seen in Figure 2, but showing the general direction taken by the rays of light.

Similar numerals of reference indicate corresponding parts in the figures.

Referring to the drawings:—

In carrying out my invention, I employ in conjunction with a source of light three essential elements which are collocated in a novel manner, so as to utilize and deflect the rays of light in horizontal planes below the top of the reflector, my invention comprising the primary parabolic reflector 1, having its curvatures 2 and 3 struck from the centers of different radii, its curvature at the point 3 being struck from the longer radius. Below the horizontal median line of the parabolic reflector 1, I locate the secondary concave or semispherical reflector 4, whose curvature is preferably struck from a center coincident with the center of the electric light 5 and said concave reflecting surface 4 merges at its front and sides into the upper portions of the convex reflector 6 located below it, said reflector 6 having also convex side walls extending from the upper front and side portions of the reflector 4 down to the bottom of the main reflector 1, the outer bottom terminus of said convex reflector being indicated at 7.

The main or primary parabolic reflector 1, as to its major area, has a reflecting surface preferably of the contour of a paraboloid of revolution, but any other paraboloidal or other equivalent surface which is adapted to the purpose may be employed.

The convex reflector 6 is so positioned that its upper edge 8 where it merges into the secondary hemispherical concave reflector 4, extends in a horizontal plane, which is positioned below the horizontal median line of the main parabolic reflector 1, and the vertical longitudinal median line of the convex reflector 6 is at a right angle to the horizontal median line of said reflector 1.

It will be further apparent that the front upper curved edge of the convex reflector 6, where it joins or merges into the secondary concave reflector 4, is positioned within the main or primary parabolic reflector 1 and at a point in advance of the source of light 5, and the front convex surface of said reflector 6 inclines, from its top downwardly and outwardly until it merges into the lower portion of said main parabolic reflector, as indicated at 7.

It consequently follows from the foregoing construction that I have produced a novel device, wherein the lower central portion of the main primary parabolic reflector 1, is rendered non-functional by reason of the position of the convex reflector 6, and consequently the lower central portion of the main reflector 1, cannot reflect light beams or rays upwardly in planes above the top of the device as would be the case, if the convex reflector 6 was omitted.

It will therefore be apparent that light rays impinging upon the convex surface 6, will be deflected against the lower side reflecting surfaces of the main parabolic reflector 1, and since in accordance with well known laws of physics, any rays from a focus are reflected from the surface of a parabolic mirror in lines parallel with the axis thereof, it will be apparent that not only will the light rays reflected from the lower sides of the main reflector 1, be intensified, but in addition the rays reflected from the concave surface 4 against the upper central and side portions of said main reflector will be greatly intensified when they leave the same.

This will be apparent from Figure 5, from which it will be seen that any direct divergent rays, which are the cause of the objectionable "road glare", will in my novel construction be so intercepted, that they will pass out from the headlight so as to illuminate the roadway close to the car and in lines parallel with the axis of the parabolic mirror 1, but always in planes below the top thereof.

I have shown diagrammatically in Figure 5, the course certain of the rays take in my device in accordance with well known optical and physical laws, the angle of incidence, and the angle of reflection being equal, and the rays striking the mirror 4 being reflected directly back across the focal point to the parabolic surface, from which they will be projected forwardly in lines parallel with the axis of the parabola, as above explained. The reflector composed of the primary parabolic surfaces 2 and 3, the secondary concave and convex surfaces 4 and 6 may be pressed, stamped, spun or otherwise formed out of sheet metal by a plurality of operations or by a single operation and may be made in sections and thereafter united or assembled by spot welding, brazing or other means well known in the art.

It is not necessary in my device to use any dimmers, and no special lenses are required, since any ordinary plate glass lens will suffice. By the employment of the secondary hemispherical reflector 4, I have found that a twenty one candle power light gives approximately the same or more light as a thirty candle power bulb, when my invention is not used.

I have not divined it necessary to show or describe in detail the light, its socket and adjuncts, as any standard type thereof may be employed.

It will further be seen that in addition to the three elements comprising the main or primary parabolic reflector 1, the concave reflector 4 and the convex reflector 6, collocated as above described, I employ the additional novel feature of making the lower portion of the reflecting surface of the parabolic reflector as indicated at 3 (see Figure 2), somewhat straighter and flatter below the center axial plane, as indicated by the section line 3—3 in Figure 1, by which construction I direct all rays striking below the central horizontal plane into the semispherical reflector 4, which are in turn reflected up to the reflector as designated by $a$ in Figure 5.

It will also be seen that the concave or hemispherical reflector 4 is somewhat less than a true hemispherical surface, since the reflecting area is formed by having the upper portion which would constitute a true hemisphere removed on a horizontal plane, conforming to the horizontal line 8, and in addition the rear of said reflecting surface is removed as indicated by the line 9.

I claim—

1. In a device of the character stated, the combination of a primary parabolic reflector and a convex reflector occupying the lower central portion of said primary reflector, and having its upper edge positioned within the front edges of said primary reflector and terminating at a point below the horizontal median line of said primary reflector.

2. In a device of the character stated, the combination of a primary parabolic reflector, a secondary, hemispherical reflector having its upper edge located below the horizontal median line of said primary reflector, and a convex reflector inclined outwardly from the front edge of said secondary reflector to the lower portion of said primary reflector.

3. In a device of the character stated, the combination of a primary parabolic reflector, a secondary hemispherical reflector, and a lower convex reflector, said two latter reflectors being located below the horizontal median line of said primary reflector, and said convex reflector having its lower portion inclined outwardly and forwardly.

4. In a device of the character stated, the combination of a primary parabolic reflector, a secondary hemispherical reflector, and a lower convex reflector, said two latter reflectors being located below the horizontal median line of said primary reflector, the front surface of said convex reflector, inclining downwardly and outwardly from a point within said primary reflector, and the vertical axis of said convex reflector being at a right angle to said horizontal median line.

5. In a device of the character stated, the combination of a primary parabolic reflector, a source of light, a secondary hemispherical reflector, and a lower convex reflector, said two latter reflectors being located below the axis of said source of light and below the horizontal median line of said primary reflector, the front surface of said convex reflector, inclining downwardly and outwardly from a point within said primary reflector, and the longitudinal vertical median line of said convex reflector being at a right angle to the horizontal median line of said primary reflector.

6. In a device of the character stated, the combination of a primary parabolic reflector having its lower reflecting area below its horizontal median line struck from a radius of greater length than its upper reflecting area, and a secondary concave reflector having its upper edge below said median line and having its reflecting area less than a hemisphere, and coacting with said primary reflector.

7. In a device of the character stated, the combination of a primary parabolic reflector having its lower reflecting area below its horizontal median line struck from a radius of greater length than its upper reflecting area and a secondary concave reflector having its reflecting area less than a hemisphere, and coacting with said primary reflector having its upper edge below said median line and the rear portion of said secondary reflector being cut away.

THOMAS DE LEON GRAHAM.

Witnesses:
E. HAYWARD FAIRBANKS,
C. D. McVAY.